US009149723B2

(12) United States Patent
Guo

(10) Patent No.: US 9,149,723 B2
(45) Date of Patent: Oct. 6, 2015

(54) RANDOM SELECTION METHOD, SERVER, CLIENT AND DISTRIBUTED SYSTEM

(76) Inventor: Junyan Guo, Wuhan (CN)

( * ) Notice: Subject to any disclaimer, the term of this patent is extended or adjusted under 35 U.S.C. 154(b) by 352 days.

(21) Appl. No.: 13/603,061

(22) Filed: Sep. 4, 2012

(65) Prior Publication Data

US 2014/0066208 A1 Mar. 6, 2014

(51) Int. Cl.
*A63F 9/24* (2006.01)
*A63F 13/00* (2014.01)
*G06F 17/00* (2006.01)
*G06F 19/00* (2011.01)
*A63F 13/335* (2014.01)
*G07F 17/32* (2006.01)

(52) U.S. Cl.
CPC ............ *A63F 13/335* (2014.09); *G07F 17/326* (2013.01)

(58) Field of Classification Search
USPC ............................... 463/20, 25, 29, 39, 40, 42
See application file for complete search history.

(56) References Cited

U.S. PATENT DOCUMENTS

| | | | |
|---|---|---|---|
| 5,718,432 A | 2/1998 | Fraser | |
| 5,945,655 A | 8/1999 | Gilgeous | |
| 5,967,893 A | 10/1999 | Lawrence | |
| 6,398,651 B1 | 6/2002 | Yamada | |
| 6,656,039 B2 | 12/2003 | Yamada | |
| 6,733,385 B1 | 5/2004 | Enzminger | |
| 6,949,022 B1 | 9/2005 | Showers | |
| 6,955,604 B1 | 10/2005 | Graves | |
| 7,198,569 B2 | 4/2007 | Wolf | |
| 7,666,080 B2 | 2/2010 | Muskin | |
| 7,736,221 B2 | 6/2010 | Black | |
| 7,901,279 B2 | 3/2011 | Finocchio | |
| 7,967,673 B2 | 6/2011 | Muskin | |
| 8,092,292 B1 | 1/2012 | White | |
| 8,133,104 B2 | 3/2012 | Black | |
| 8,210,532 B2 | 7/2012 | Evans | |
| 2004/0063483 A1 | 4/2004 | Wolf | |
| 2004/0251630 A1 | 12/2004 | Sines | |
| 2005/0085286 A1 | 4/2005 | Muskin | |
| 2005/0101367 A1 | 5/2005 | Soltys | |
| 2009/0221367 A1 | 9/2009 | Longley | |
| 2010/0016051 A1 | 1/2010 | Nicely | |
| 2010/0227663 A1 | 9/2010 | Muskin | |
| 2011/0218023 A1 | 9/2011 | Hall | |
| 2011/0281641 A1 | 11/2011 | Weller | |
| 2011/0316232 A1 | 12/2011 | Herren | |
| 2012/0021812 A1 | 1/2012 | Muskin | |
| 2012/0108314 A1 | 5/2012 | Enzminger | |
| 2013/0079147 A1* | 3/2013 | Merati | ............................ 463/42 |

* cited by examiner

*Primary Examiner* — Adetokunbo O Torimiro
(74) *Attorney, Agent, or Firm* — Michael Fedrick; Loza & Loza, LLP

(57) ABSTRACT

The embodiments of the present invention provide a random selection method, server, client and distributed system. The random selection method includes: generating, by a server, a plurality of objects for an online game, and ordering randomly the plurality of objects; transmitting display information to a plurality of clients, so as to make the ordered plurality of objects displayed on a display screen of each client in a manner of content being unknown, so that each user randomly select from the ordered plurality of objects; and designating, by the server, a user-selected object for the user according to feedback from the client. In this invention, the user may participate in the process of random selection, and random ordering by the system and the random selection by the user are combined, thereby the fairness of the random dealing is ensured.

16 Claims, 19 Drawing Sheets

| Index1 | Value1 |
|--------|--------|
| Index2 | Value2 |
| Index3 | Value3 |
| Index4 | Value4 |
| Index5 | Value5 |
| Index6 | Value6 |
| Index7 | Value7 |
| Index8 | Value8 |
| Index9 | Value9 |
| Index10 | Value10 |
| Index11 | Value11 |
| Index12 | Value12 |
| Index13 | Value13 |
| Index14 | Value14 |
| Index15 | Value15 |
| Index16 | Value16 |
| Index17 | Value17 |
| Index18 | Value18 |
| Index19 | Value19 |
| Index20 | Value20 |
| Index21 | Value21 |
| Index22 | Value22 |

Fig. 10

| Index1 | Value1 |
|--------|--------|
| Index2 | Value2 |
| Index3 | Value3 |
| Index4 | Value4 |
| Index5 | Value5 |
| Index6 | Value6 |
| Index7 | Value7 |
| Index8 | Value8 |
| Index9 | Value9 |
| Index10 | Value10 |
| Index11 | Value11 |
| Index12 | Value12 |
| Index13 | Value13 |
| Index14 | Value14 |
| Index15 | Value15 |
| Index16 | Value16 |
| Index17 | Value17 |
| Index18 | Value18 |
| Index19 | Value19 |
| Index20 | Value20 |
| Index21 | Value21 |

Fig. 11

RANDOM SELECTION METHOD, SERVER, CLIENT AND DISTRIBUTED SYSTEM

TECHNICAL FIELD

The present invention relates to the field of online games, and in particular to a random selection method of unknown options, server, client and distributed system.

BACKGROUND ART

With the development of network technologies, online games are more and more popular. A user may play games with others by using a distributed system. Currently, there are various kinds of chess and card online games, such as Blackjack, and Texas HoldEm Poker, etc. A manner of simulating dealing cards in these games is as follows: ordering randomly all the cards by server software by using a set of random algorithms, and then dealing the cards to each player in turn.

However, the inventor found that in such a manner, a user has no right to select the cards of his own, and the random algorithms used by the server software cannot ensure the absolute randomness of the card dealing. Hence, current online games cannot ensure the fairness.

SUMMARY OF THE INVENTION

The embodiments of the present invention provide a random selection method, server, client and distributed system, with the object being to improve the randomness of options in online games, and ensure the fairness of the online game.

According to an aspect of the embodiments of the present invention, there provides a random selection method, applied in a distributed system of online games, the random selection method includes:

generating, by a server, a plurality of objects for an online game, and ordering the plurality of objects randomly;

transmitting display information to a plurality of clients, so as to make the ordered plurality of objects displayed on a display screen of each client in a manner of content being unknown, so that each user randomly selects from the ordered plurality of objects; and designating, by the server, a user-selected object for the user according to feedback from the client.

According to another aspect of the embodiments of the present invention, where the method further includes:

receiving, by the server, information of a selected object transmitted by a user via a client; and updating display information of other clients, so that other users cannot select the object that has been selected.

According to another aspect of the embodiments of the present invention, where the object is a card, poker, or mahjong.

According to another aspect of the embodiments of the present invention, there provides a random selection method, applied in a distributed system of online games, the random selection method includes:

receiving, by a client, information transmitted by a server, and displaying a plurality of randomly-ordered objects on a display screen in a manner of content being unknown;

receiving input information of a user, so as to randomly select from the plurality of objects; and transmitting, by the client to the server, information of the selected object.

According to another aspect of the embodiments of the present invention, where the method further includes:

displaying, by the client, an object designated by the server for the user.

According to another aspect of the embodiments of the present invention, where the method further includes:

receiving, by the client, update information from the server, and updating display information so that the object that has been selected cannot be selected again.

According to another aspect of the embodiments of the present invention, where the client displays the plurality of objects in a tiling or superimposed tiling manner.

According to another aspect of the embodiments of the present invention, where the client receives the information inputted by the user in a clicking selection manner, so as to randomly select from the plurality of objects.

According to another aspect of the embodiments of the present invention, there provides a server, applied in a distributed system of online games, the server includes:

an ordering unit, configured to generate a plurality of objects for an online game, and randomly order the plurality of objects;

a first transmitting unit, configured to transmit display information to a plurality of clients, so as to make the ordered plurality of objects displayed on a display screen of each client in a manner of content being unknown, so that each user randomly selects from the ordered plurality of objects; and a designating unit, configured to designate a user-selected object for the user according to feedback from the client.

According to another aspect of the embodiments of the present invention, where the server further includes:

a first receiving unit, configured to receive information of the selected object transmitted by a user via a client; and an updating unit, configured to update display information of other clients, so that other users cannot select the object that has been selected.

According to another aspect of the embodiments of the present invention, there provides a client, applied in a distributed system of online games, the client includes:

a second receiving unit, configured to receive information transmitted by a server;

a displaying unit, configured to display a plurality of randomly-ordered objects on a display screen in a manner of content being unknown;

a selecting unit, configured to receive input information of a user, so as to randomly select from the plurality of objects; and a second transmitting unit, configured to transmit information of the selected object to the server.

According to another aspect of the embodiments of the present invention, where the displaying unit is further configured to display the object designated by the server for the user.

According to another aspect of the embodiments of the present invention, where the displaying unit displays the plurality of objects in a tiling or superimposed tiling manner.

According to another aspect of the embodiments of the present invention, where the selecting unit receives the information inputted by the user in a clicking selection manner, so as to randomly select from the plurality of objects.

According to another aspect of the embodiments of the present invention, where the second receiving unit is further configured to receive update information from the server, and the displaying unit is further configured to update display information, so that the object that has been selected cannot be selected again.

According to another aspect of the embodiments of the present invention, there provides a distributed system, which is applicable to online games, the distributed system comprising:

a server, configured to generate a plurality of objects for an online game, and order randomly the plurality of objects; transmit display information to a plurality of clients, so as to make the ordered plurality of objects displayed on a display screen of each client in a manner of content being unknown, so that each user randomly selects from the ordered plurality of objects; and designate a user-selected object for the user according to feedback from the client;

a plurality of clients, configured to receive the information transmitted by the server, and display the plurality of randomly-ordered objects on the display screen in a manner of content being unknown; receive input information of the user, so as to randomly select from the plurality of objects; and transmit the information of the selected object to the server.

According to another aspect of the embodiments of the present invention, where the server receives the information of the selected object transmitted by a user via a client, and updates the display information of other clients; and the clients receive the update information from the server, and update the display information so that the object that has been selected cannot be selected.

According to another aspect of the embodiments of the present invention, there provides a computer-readable program, wherein when the program is executed in a server, the program enables the computer to carry out the random selection method in the server.

According to another aspect of the embodiments of the present invention, there provides a storage medium in which a computer-readable program is stored, wherein the computer-readable program enables the computer to carry out the random selection method in the server.

According to another aspect of the embodiments of the present invention, there provides a computer-readable program, wherein when the program is executed in a client, the program enables the computer to carry out the random selection method in the client.

According to another aspect of the embodiments of the present invention, there provides a storage medium in which a computer-readable program is stored, wherein the computer-readable program enables the computer to carry out the random selection method in the client.

The advantages of the present invention exist in that: the server randomly order a plurality of objects, a user randomly selects an object from the ordered plurality of objects, and the selected object is designated to the user according to the information fed back from the user, so that the user can participate in the process of random selection, and also random ordering by the system and the random selection by the user are combined, thereby the fairness of the random selection is ensured.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings:

FIG. 10 is a schematic diagram showing that randomly-ordered cards are stored in a linked list;

FIG. 11 is a schematic diagram showing that the linked list shown in FIG. 10 is selected once;

DETAILED DESCRIPTION OF THE INVENTION

These and further aspects and features of the present invention will be apparent with reference to the following description and attached drawings. In the description and drawings, particular embodiments of the invention have been disclosed in detail as being indicative of some of the ways in which the principles of the invention may be employed, but it should be understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of other embodiments.

It should be emphasized that the term "comprises/comprising" used in this specification is taken to specify the presence of stated features, integers, steps or components but does not preclude the presence or addition of one or more other features, integers, steps, components or groups thereof.

Embodiment 1

An embodiment of the present invention provides a random selection method, applied in a distributed system of online games. The random selection method of this embodiment may be applied to a server side.

Figure 1:
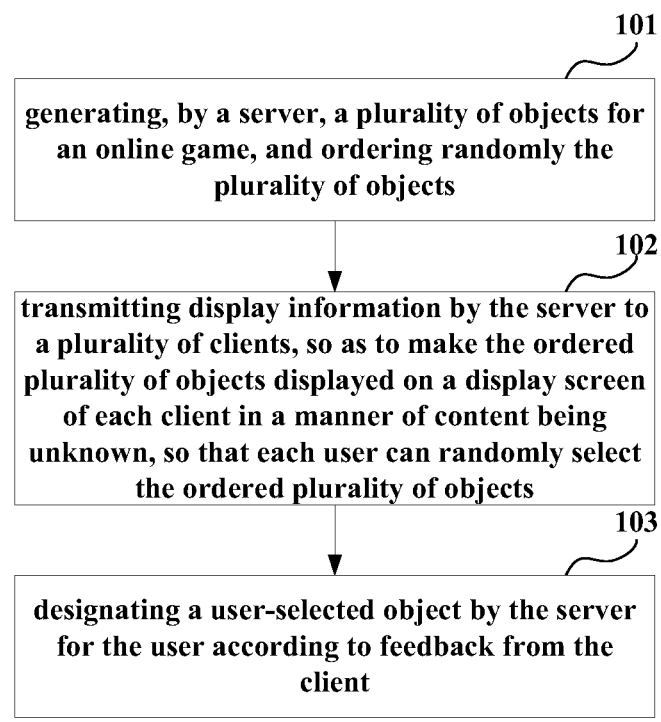
FIG. 1 is a flowchart of the random selection method of the embodiment 1 of the present invention.

FIG. 1 is a flowchart of the random selection method of the embodiment of the present invention. As shown in FIG. 1, the random selection method includes:

step 101: generating, by a server, a plurality of objects for an online game, and ordering randomly the plurality of objects;

step 102: transmitting, by the server, display information to a plurality of clients, so as to make the ordered plurality of objects displayed on a display screen of each client in a manner of content being unknown, so that each user can randomly select the ordered plurality of objects; and step 103: designating, by the server, a user-selected object for the user according to feedback from the client.

In this embodiment, the online game may be chess and card online games, such as Blackjack, Texas HoldEm Poker, and mah-jong, etc. And the object (which may also be referred to as an option) may be a virtual card, poker, or mah-jong, etc. in an online game. However, it is not limited thereto, and particular options may be determined as actually required.

In this embodiment, the online game may run in a distributed system, which may include geographically-distributed server and client. For example, it may be a server and several clients, each user playing an online game with other users via a client. However, it is not limited thereto, and there may be a plurality of servers, for example. For the convenience of explanation, following description is given taking that there are one server and a plurality of clients as an example.

Figure 2:
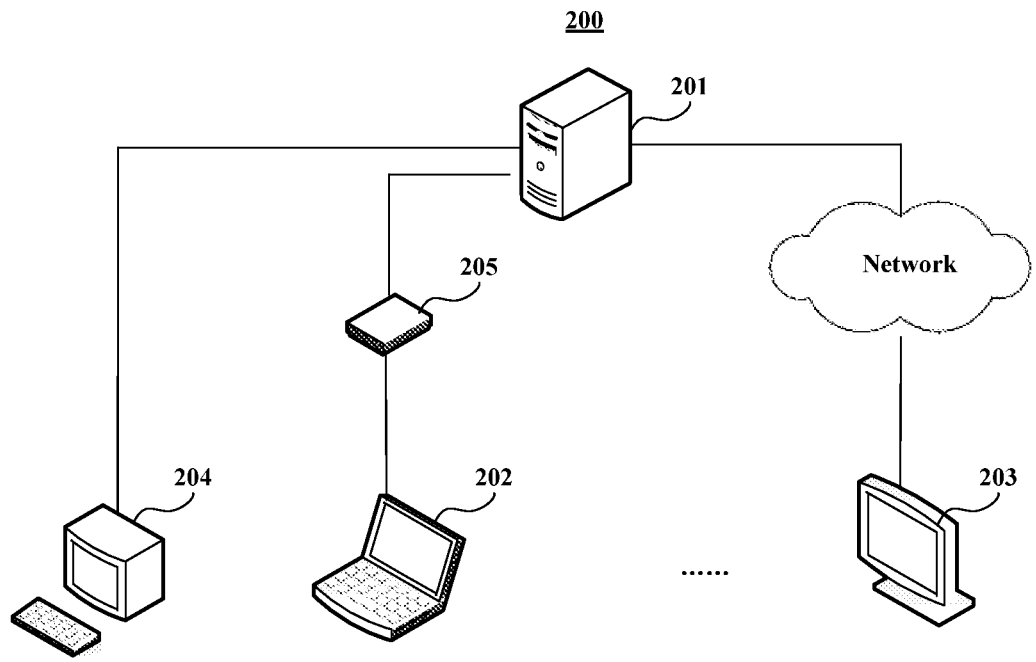
FIG. 2 is a schematic diagram of the construction of the distributed system of the embodiment 1 of the present invention.

FIG. 2 is a schematic diagram of the construction of the distributed system of the embodiment of the present invention. As shown in FIG. 2, the distributed system 200 may include, for example, a server 201, a notebook computer 202, a working station 203, and a terminal 204, etc. The notebook computer 202, working station 203 and terminal 204 may be clients of the present invention used by users, and those clients are connected to the server 201 via a network, for example, they can be connected via a modem 205.

In this embodiment, a client has a display screen which may display related information of an online game, for example, a virtual player and various properties may be displayed by images. The client may further have an input device, such as a keypad, a mouse or a touch screen, and the user may interact with other users via the input device.

In this embodiment, the server may generate a plurality of objects for an online game, such as cards; however, it is not limited thereto. For the convenience of explanation, following description is given taking cards as an example.

For example, the server may generate 54 cards, and then randomly order the 54 cards by using random algorithms. For example, 1973rand.num may be used, which passes the international authentication and ensures the randomness of card dealing. In such a random algorithm, the random ordering of all the cards in each round is generated on the basis of the random ordering of all the cards in the last round. Hence, a repeated random series will not be generated. However, it is not limited thereto, and other random algorithms may be used.

In this embodiment, the server may transmit information of the ordered plurality of objects to a client participating in the online game, such that the plurality of objects are displayed on the display screen of the client in a manner of content being unknown; that is, the plurality of objects are arranged on the display screen, but all the users do not know the contents of the objects. For example, the backs of the plurality of objects may be displayed on the display screen, or the fronts may be displayed with the contents being blocked. The following description is given taking that the backs of the objects are displayed as an example; however, it is not limited thereto, and particular implementation may be determined as actually required.

Figure 3:
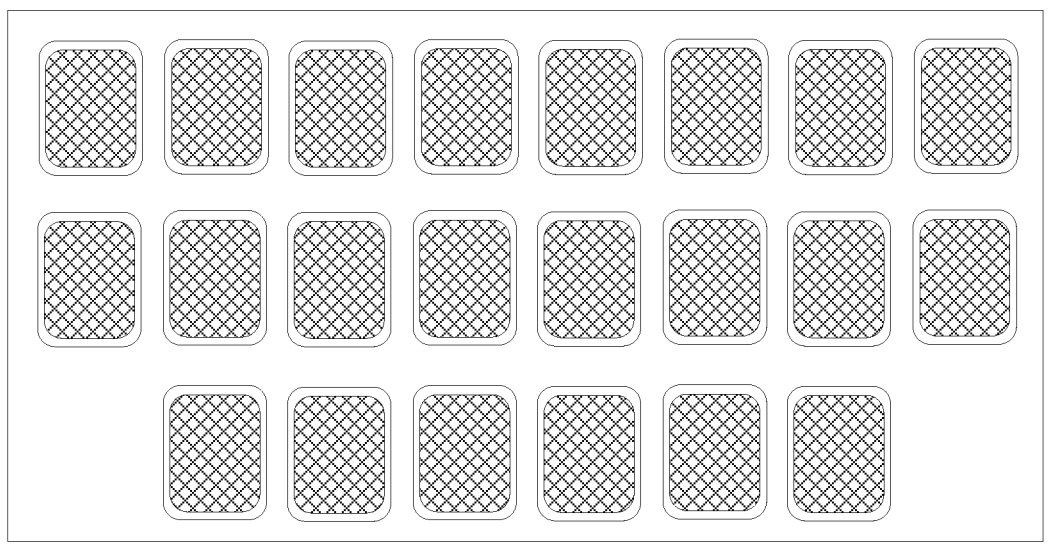
FIG. 3 is a schematic diagram showing that a certain client displays a plurality of objects.

FIG. 3 is a schematic diagram showing that a certain client displays a plurality of objects. As shown in FIG. 3, 22 cards are arranged on the display screen of the client and their backs are displayed, which are displayed to a user in a "facing down" manner.

In this embodiment, a user may randomly select the plurality of objects displayed by a client, and each user may select according to the order in turn. For example, a user may be assigned as the dealer, and the dealer may select the first card after the game starts, then the next user may select the second card, and so on. All players may select cards clockwise around a virtual table in the game.

In this embodiment, the users may use input devices to select. For example, they may select by clicking with mice, or may select by clicking with touch screens. And the client may transmit information of the selected objects to the server, and the server designates an object selected by a user to the user.

Figure 4:
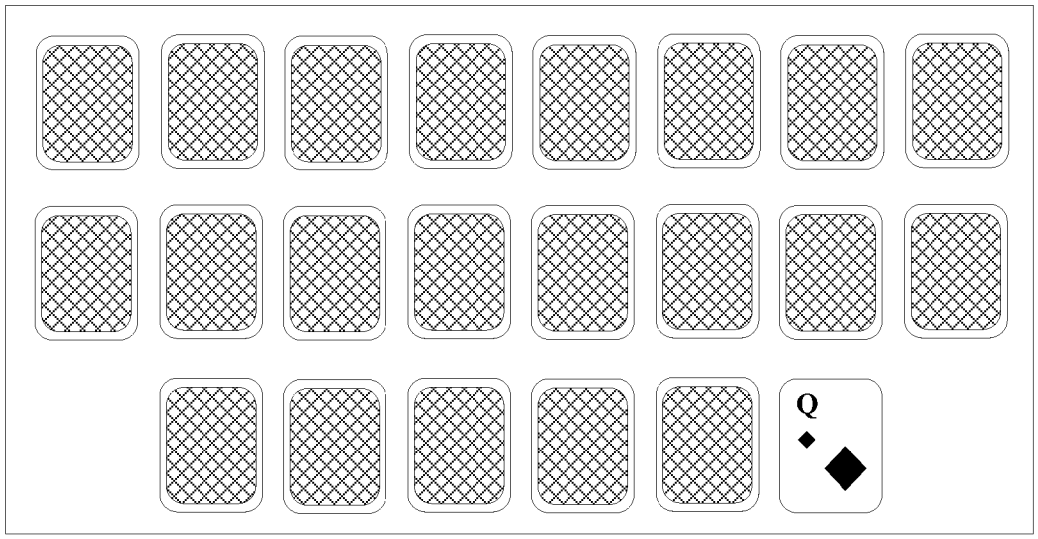
FIG. 4 is a schematic diagram showing the display of the client after selection by a user.

FIG. 4 is a schematic diagram showing the display of the client after selection by a user. As shown in FIG. 4, after random selection by the user, the card is turned over and the content of the card is displayed. However, the content of the selected card is still unknown to other users and is in an unselectable state.

Figure 5:
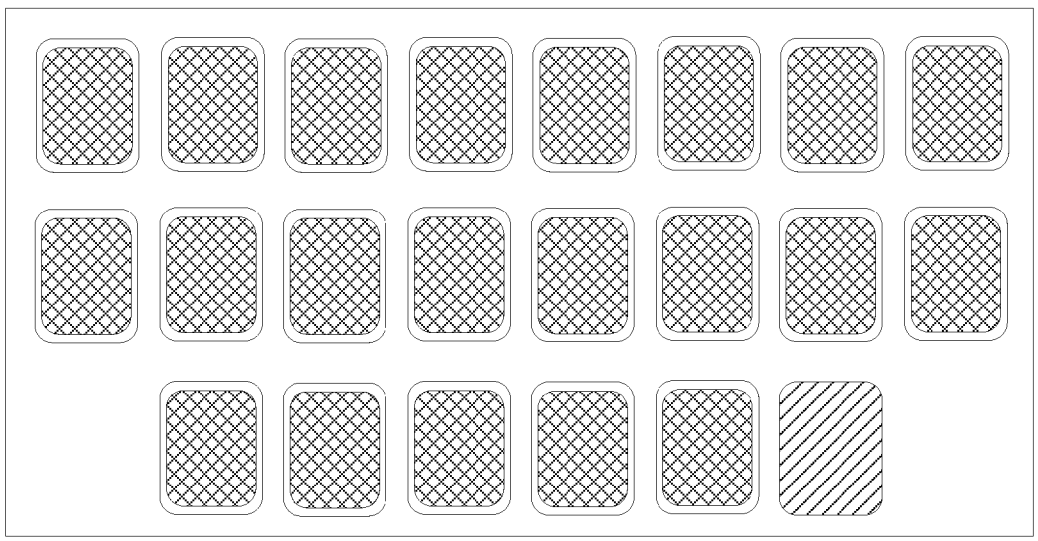
FIG. 5 is a schematic diagram showing displays of other clients after selection by a user.
Figure 6:
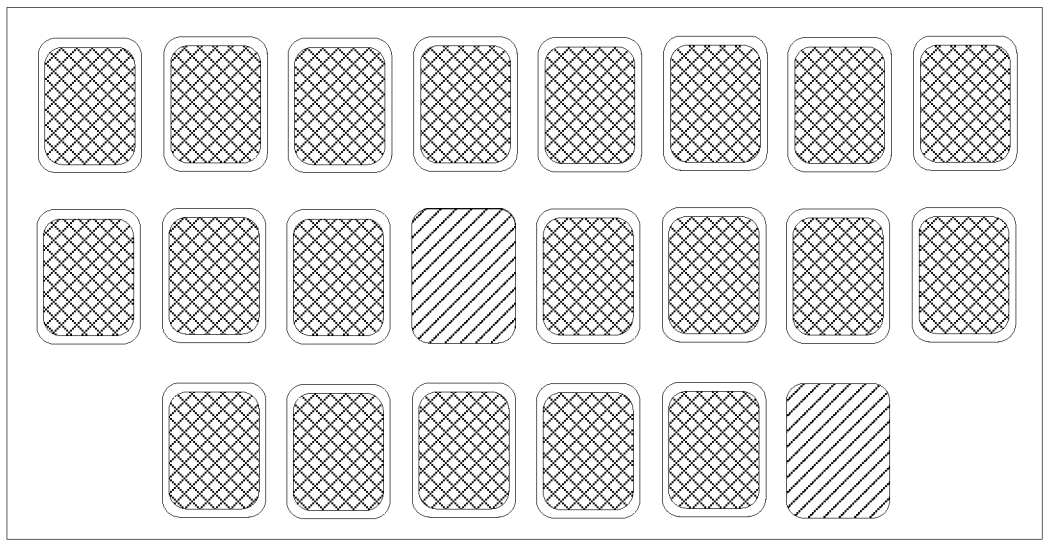
FIG. 6 is a schematic diagram showing displays of other clients after selection by two users.

FIG. 5 is a schematic diagram showing display of other client after selection by a user, and FIG. 6 is a schematic diagram showing display of other client after selection by two users. As shown in FIGS. 5 and 6, after random selection by the user, the card turns grey and is unselectable, and other users can only randomly select from the rest of the objects.

It should be noted that FIGS. 3-6 schematically show displays of the clients in a tiled clicking manner. However, the present invention is not limited thereto, and particular contents and manners of display may be determined as actually required.

Figure 7:
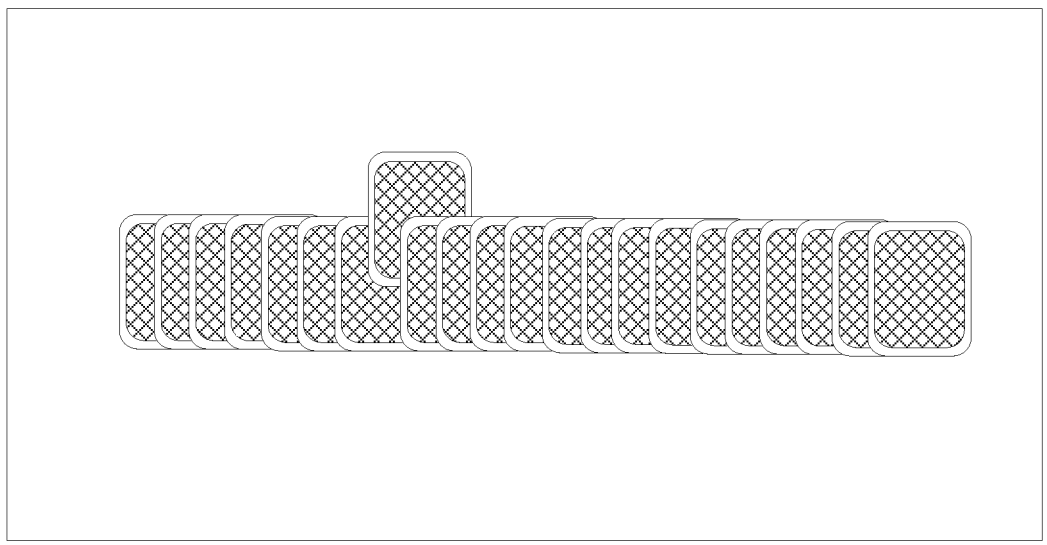
FIG. 7 is another schematic diagram showing that a client displays a plurality of objects.
Figure 8:
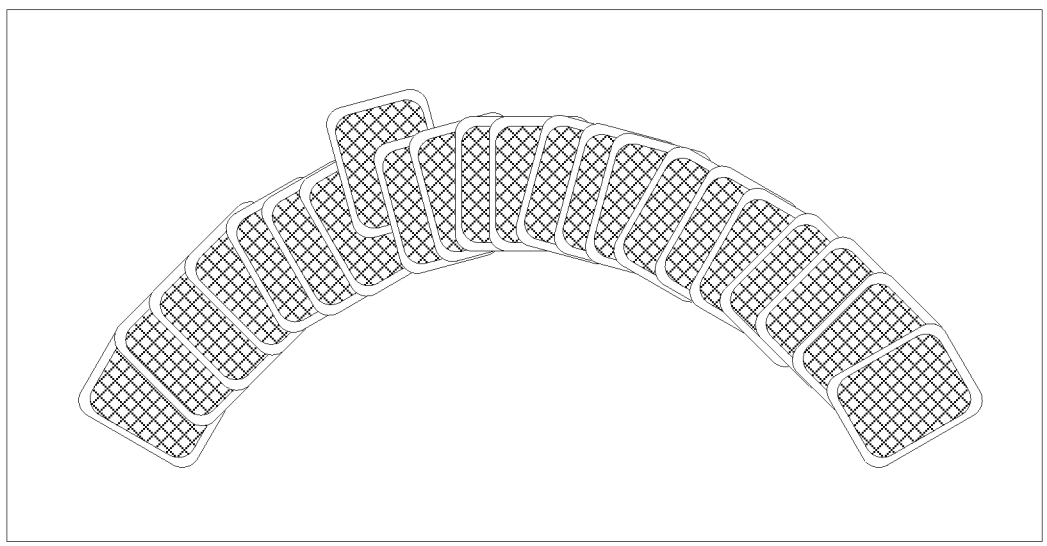
FIG. 8 is still another schematic diagram showing that a client displays a plurality of objects.

For example, a client may display in a superimposed tiling manner. FIG. 7 is another schematic diagram showing that a client displays a plurality of objects, and FIG. 8 is still another schematic diagram showing that a client displays a plurality of objects. As shown in FIGS. 7 and 8, a plurality of cards may be superimposed and tiled for randomly selecting by users.

It can be seen from the above embodiment that the server randomly order a plurality of objects, a user randomly selects an object from the ordered plurality of objects, and the selected object is designated to the user according to the information fed back by the user, such that the user may participate in the process of random selection, and random ordering by the system and the random selection by the user are combined, thereby the fairness of the random dealing is ensured.

Embodiment 2

On the basis of embodiment 1, another embodiment of the present invention provides a random selection method, applicable to a distributed system of online games. The random selection method of this embodiment may be applied to a server side.

Figure 9:
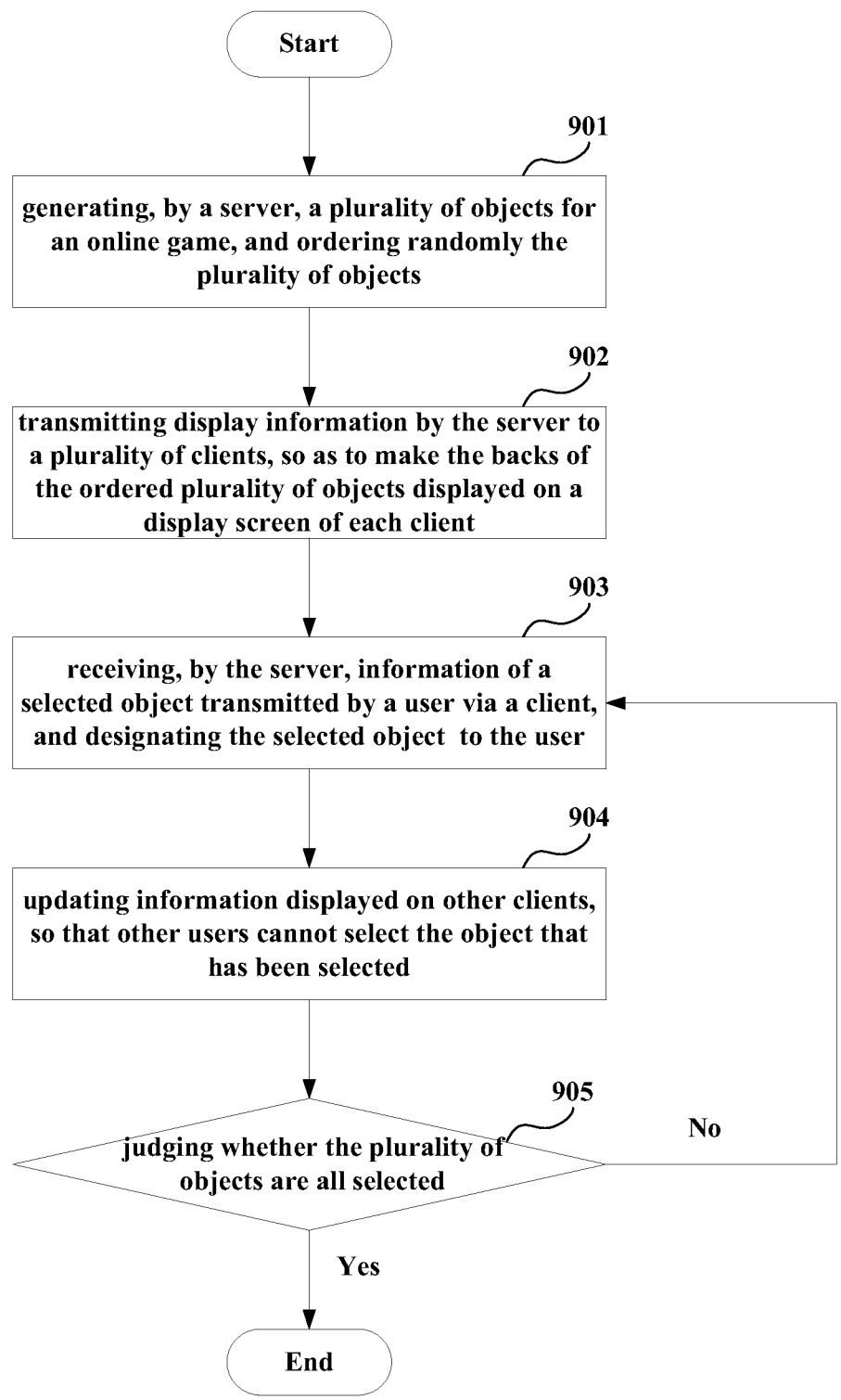
FIG. 9 is a flowchart of the random selection method of the embodiment 2 of the present invention.

FIG. 9 is another flowchart of the random selection method of the embodiment of the present invention. As shown in FIG. 9, the random selection method comprises:

step 901: generating, by a server, a plurality of objects for an online game, and ordering randomly the plurality of objects;

step 902: transmitting, by the server, display information to a plurality of clients, so as to make the backs of the ordered plurality of objects displayed on a display screen of each client, so that each user can randomly select the ordered plurality of objects;

step 903: receiving, by the server, information on a selected object transmitted by a user via a client, and designating the selected object to the user;

step 904: updating information displayed on other clients, so that other users cannot select the object that has been selected; and step 905: judging whether the plurality of objects are all selected, terminating the process of random selection if the plurality of objects are all selected, and executing step 903 to continue the random selection if there remain objects that are not selected.

In this embodiment, each user may randomly select multiple times in an order of players, such as all players select cards clockwise around a virtual table in the game. For example, in a card game, 54 cards may be generated and 4 users participate in the game; thus, each user may randomly select 12 times and get 12 cards, while the rest 6 cards are left for the banker.

In this way, interaction between a server and a client is incorporated into the present invention. At the beginning of a game, the server randomly order all the cards for the first time, however, the cards selected by the users are not decided by the first-time random ordering; and the users also participate in the process of card dealing, having half of the initiative. The selection of the cards listed on the operating interface of the client by the users is also random, thereby constituting a secondary random process of card selection. This not only enhances greatly the fairness of a game, but also greatly enhances excitement of the game, and the game experiences of the players are also enriched.

In implementation, a linked list may be used to carry out the present invention; however, it is not limited thereto, and an array may used in implementation, for example. The present invention will be described below taking a linked list as an example, in which 22 cards are to be selected.

FIG. 10 is a schematic diagram showing that randomly-ordered cards are stored in a linked list. As shown in FIG. 10, each item in the linked list may include two parts: a value of a card and an index of a card. In the process of card selection, a server may generate a linked list poker, then randomly order the 22 cards by using a random algorithm (for example, the 1973rand.num algorithm), and the randomly-ordered cards are stored in the linked list poker shown in FIG. 10.

Thereafter, the server may transmit the backs of the 22 cards (which may be a card box when being displayed on the operating interface) to the clients of all the users participating in the game, each card being actually representative of an index value.

At a certain client, the user may randomly select one card from the 22 cards, and the client transmits the index value of the selected card to the server. The server inquires a corresponding value of the card in the linked list after receiving the index value transmitted by the client, and transmits the value of the card to the client. The client displays the value of the selected card.

After an object is selected, it may be deleted from the linked list, and hence, it cannot be selected by a user. FIG. 11 is a schematic diagram showing that the linked list shown in FIG. 10 is selected once. As shown in FIG. 11, the index value and card value of the 22nd card are deleted.

In this embodiment, a user may randomly select once or more times according to the rules for gaming. In implementation, the first card of each of the players may be taken as a "Hole card" (for example, refer to the description of the Zynga Poker), which may be seen by the user himself, and others may only see the back of the card. However, it is not limited thereto, and it may also be that the user cannot see the cards of other users. Particular implementation may be determined according to ways of playing of online games.

Following description is given in detail in conjunction with FIGS. 12-22 taken a particular game as an example. For example, each user may select 3 cards on his own, and after selection of cards of all users, the card box and the cards of all the users may be shown.

Figure 12:
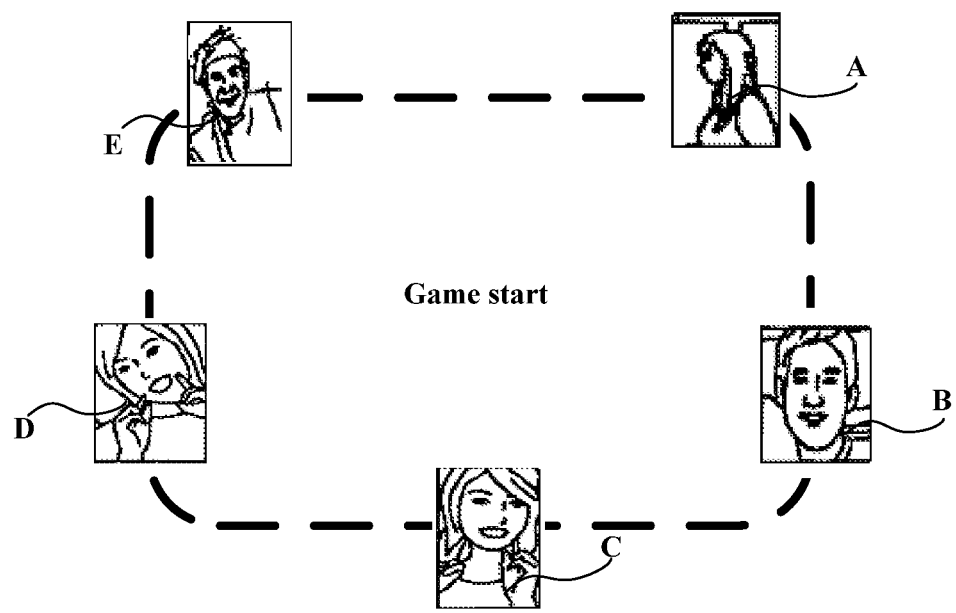
FIG. 12 shows a scene before the game starts.
Figure 13:
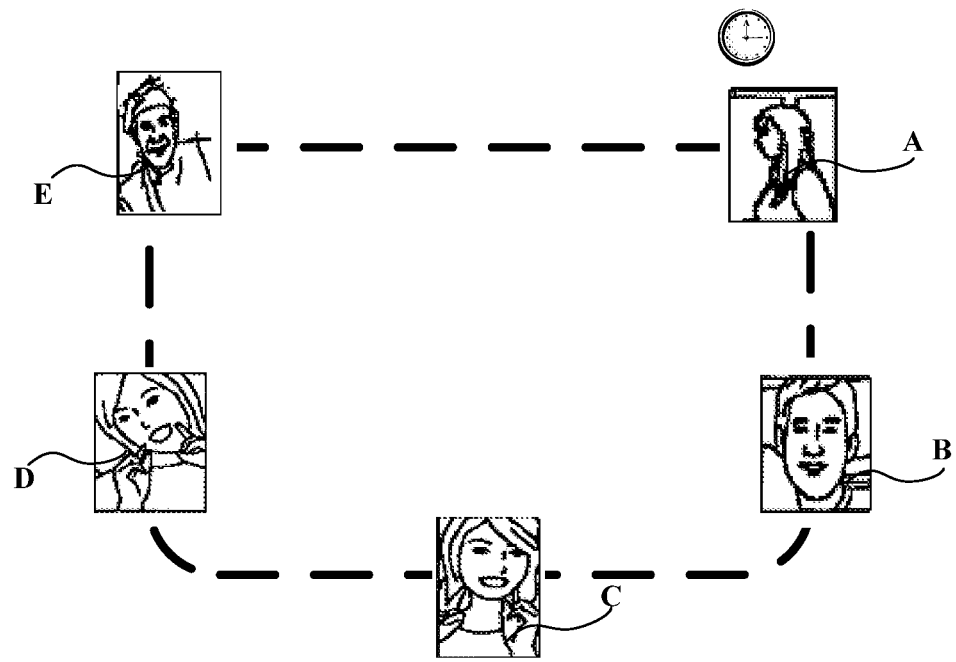
FIG. 13 shows a scene of the first user A in selecting his/her first card.
Figure 14:
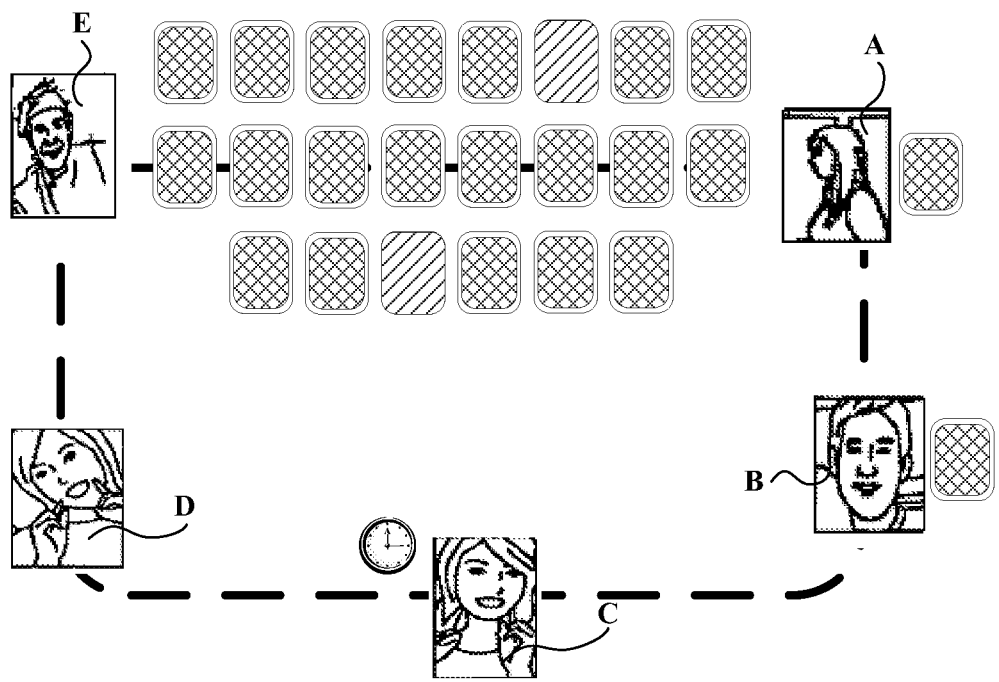
FIG. 14 shows a scene of the user C in selecting his/her first card.
Figure 15:
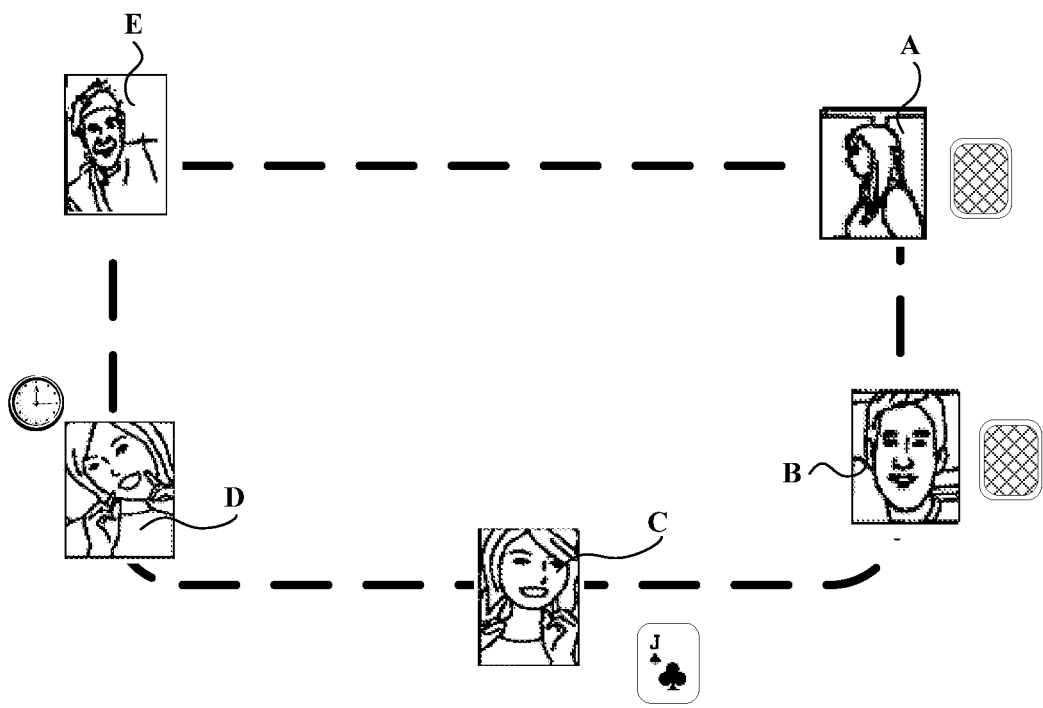
FIG. 15 shows a scene of the next user D in selecting his/her first card.
Figure 16:
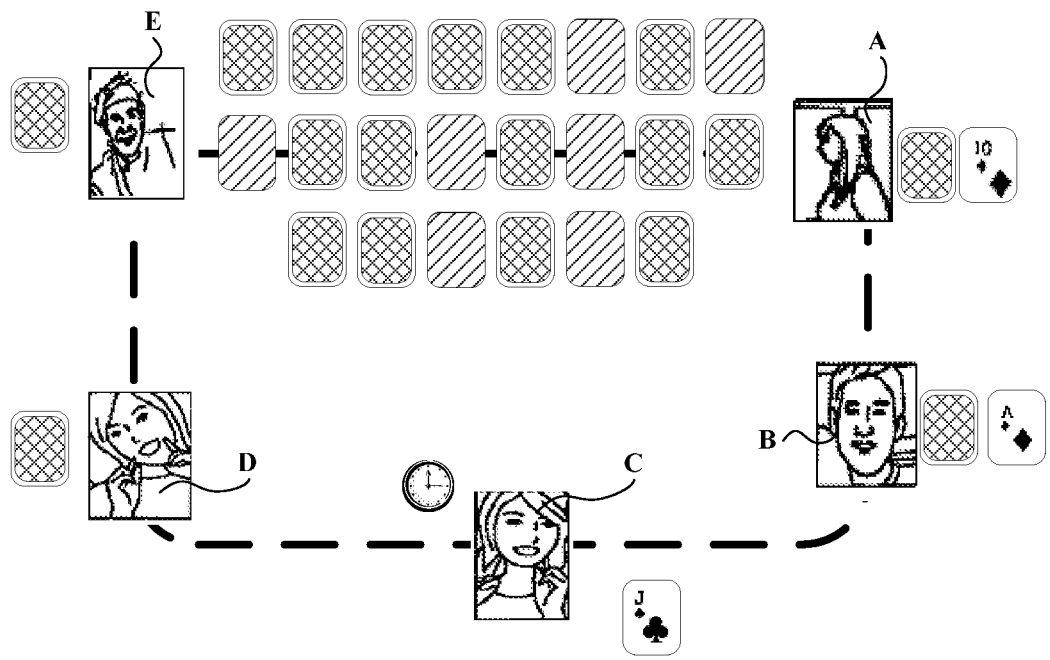
FIG. 16 shows a scene of the user C in selecting his/her second card.
Figure 17:
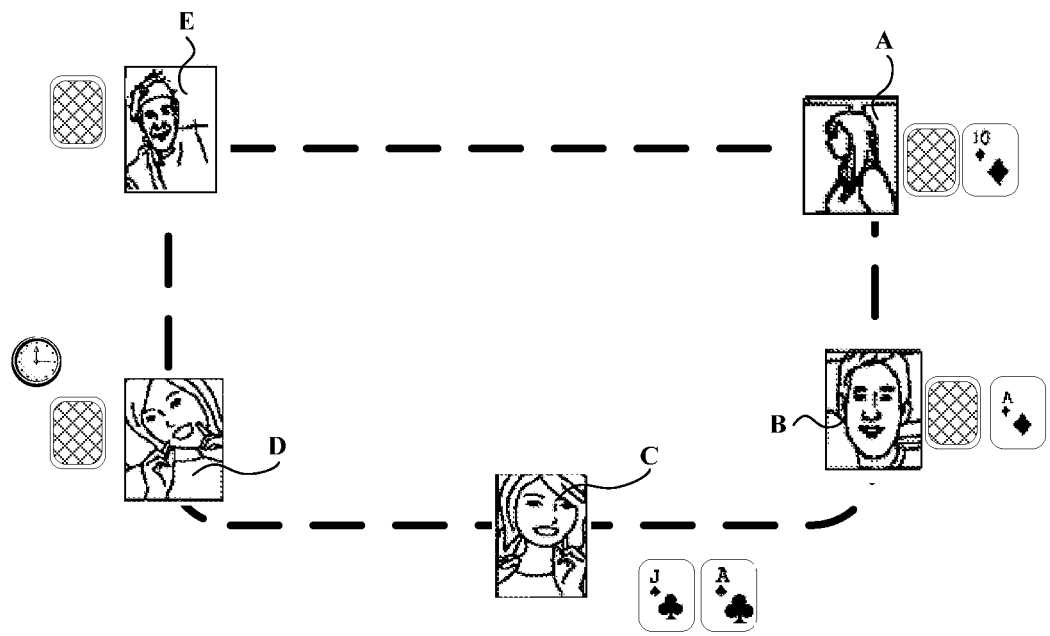
FIG. 17 shows a scene of the next user D in selecting his/her second card.
Figure 18:
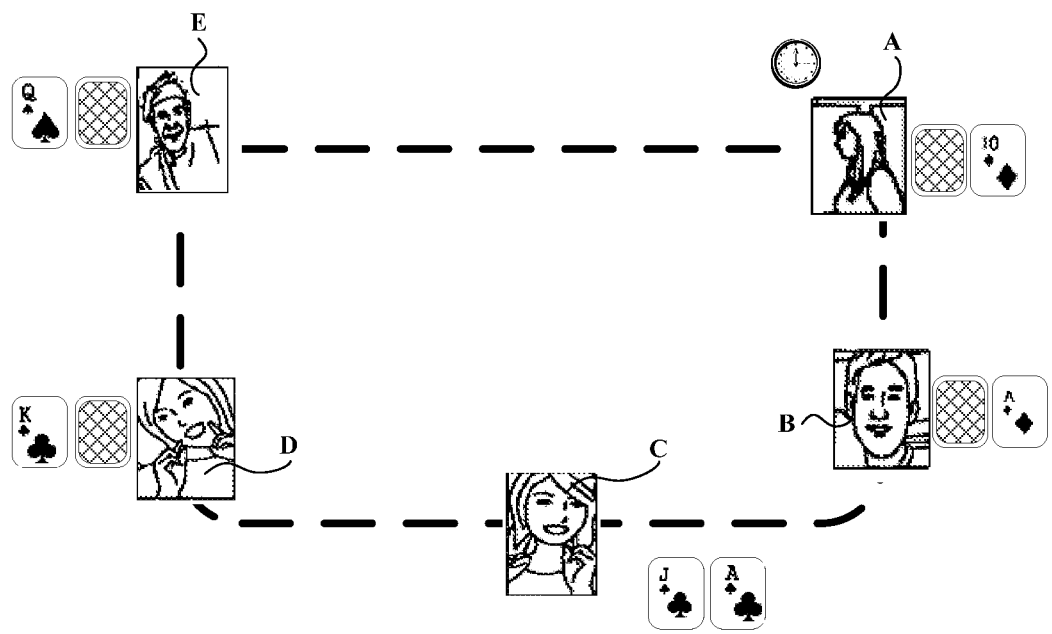
FIG. 18 shows a scene of the first user A in selecting his/her third card.
Figure 19:
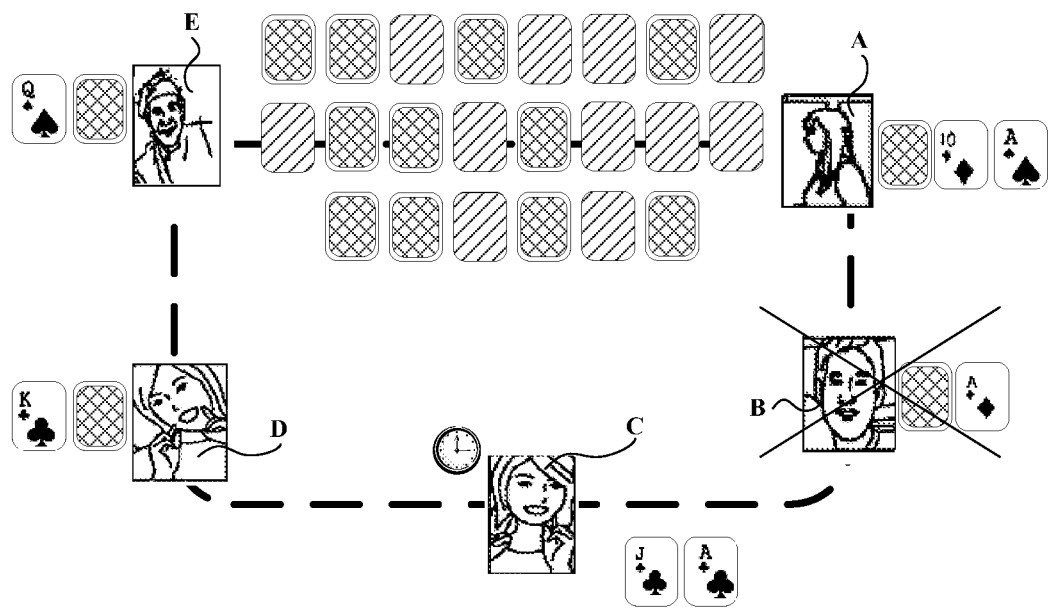
FIG. 19 shows a scene of the user C in selecting his/her third card, in which the user B has folded.
Figure 20:
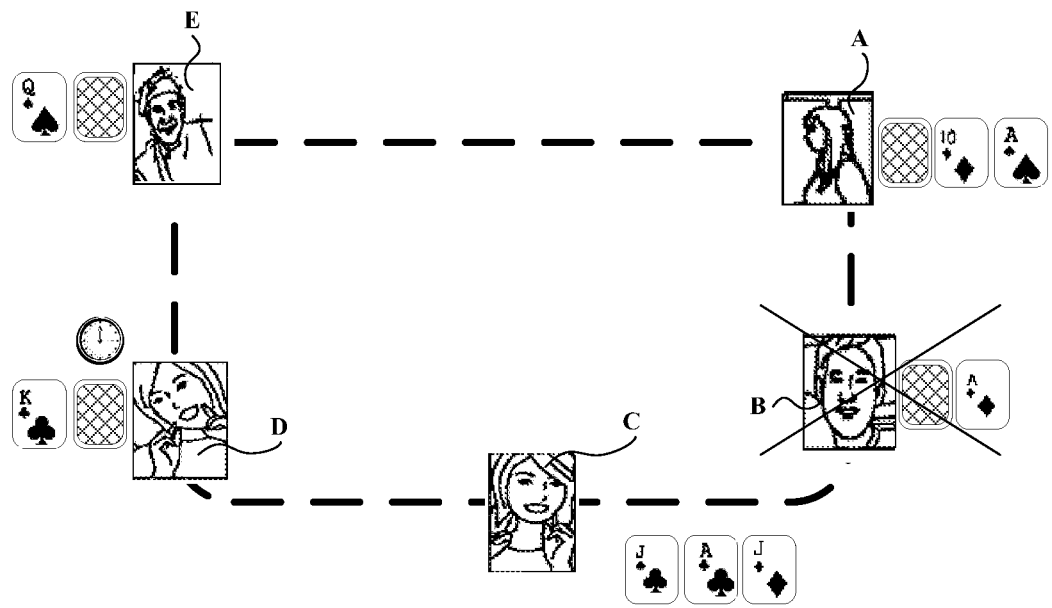
FIG. 20 shows a scene of the next user D in selecting his/her third card.
Figure 21:
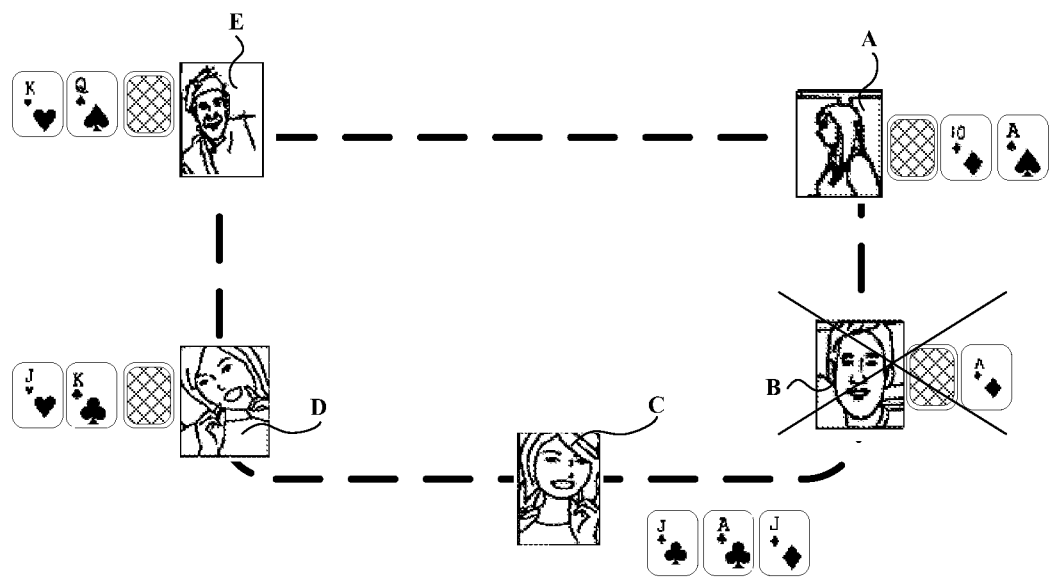
FIG. 21 shows a scene in which the selection of the cards of all the users has done and the user B has folded.
Figure 22:
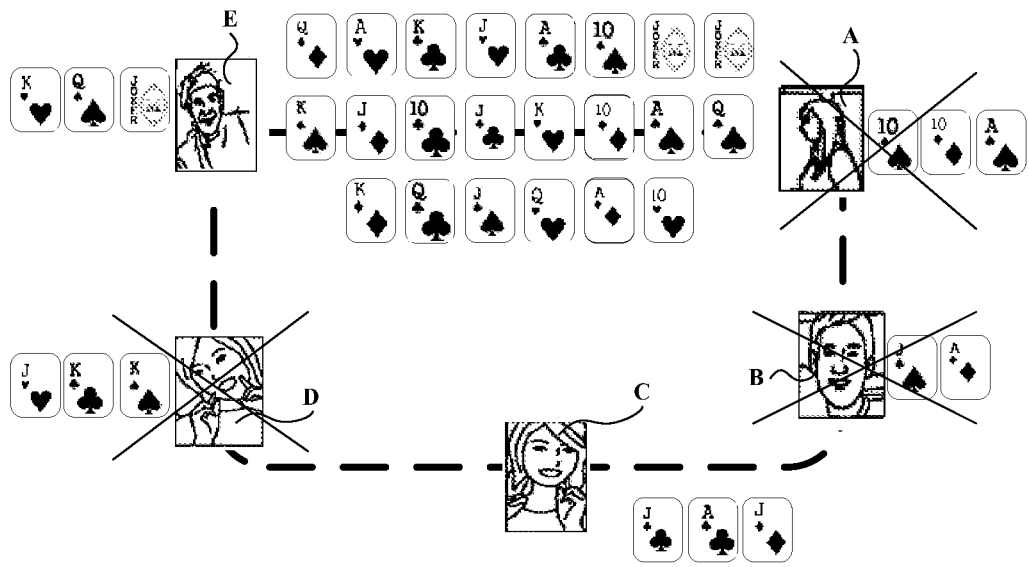
FIG. 22 shows a scene in which faces of all the cards are displayed at a stage of comparison.

As shown in FIGS. 12-22, there may be 5 users A-E participating in the game. FIGS. 12-22 are schematic diagram showing partial views of the client corresponding to user C. FIG. 12 shows a scene before the game starts, FIG. 13 shows a scene of the first user A in selecting his/her first card, FIG. 14 shows a scene of the user C in selecting his/her first card, FIG. 15 shows a scene of the next user D in selecting his/her first card, FIG. 16 shows a scene of the user C in selecting his/her second card, FIG. 17 shows a scene of the next user D in selecting his/her second card, FIG. 18 shows a scene of the first user A in selecting his/her third card, FIG. 19 shows a scene of the user C in selecting his/her third card, in which the user B has folded, FIG. 20 shows a scene of the next user D in selecting his/her third card, FIG. 21 shows a scene in which the selection of the cards of all the users has done and the user B has folded, and FIG. 22 shows a scene in which faces of all the cards are displayed at a stage of comparison.

It can be seen from the above embodiment that the server randomly order a plurality of objects, a user randomly selects an object from the ordered plurality of objects, and the user-selected object is designated to the user according to the information fed back by the user, such that the user may participate in the process of random selection, and random ordering by the system and the random selection by the user are combined, thereby the fairness of the random dealing is ensured.

Embodiment 3

This embodiment of the present invention provides a random selection method, applied in a distributed system of online games. The random selection method of this embodiment may be applied to a client side, and those identical parts could refer to embodiment 1 or 2.

Figure 23:
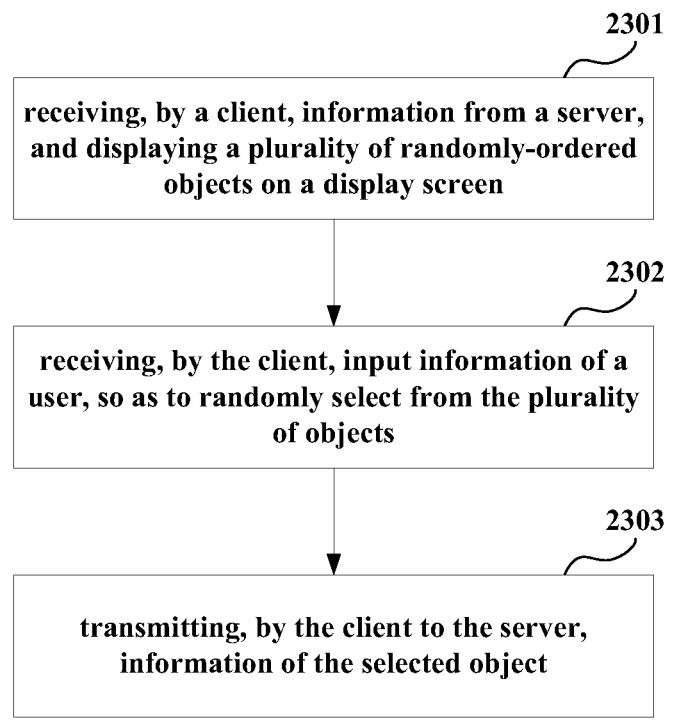
FIG. 23 is a flowchart of the random selection method of the embodiment 3 of the present invention.

FIG. 23 is another flowchart of the random selection method of the embodiment of the present invention. As shown in FIG. 23, the random selection method includes:

step 2301: receiving, by a client, information from a server, and displaying a plurality of randomly-ordered objects on a display screen;

step 2302: receiving, by the client, input information of a user, so as to randomly select from the plurality of objects; and step 2303: transmitting, by the client to the server, information of the selected object.

In this embodiment, a client may display a plurality of objects in a tiling or superimposed tiling manner. And a user may randomly select in a clicking selection manner, and a client receives information inputted by the user, so as to realize random selection of the plurality of objects.

Figure 24:
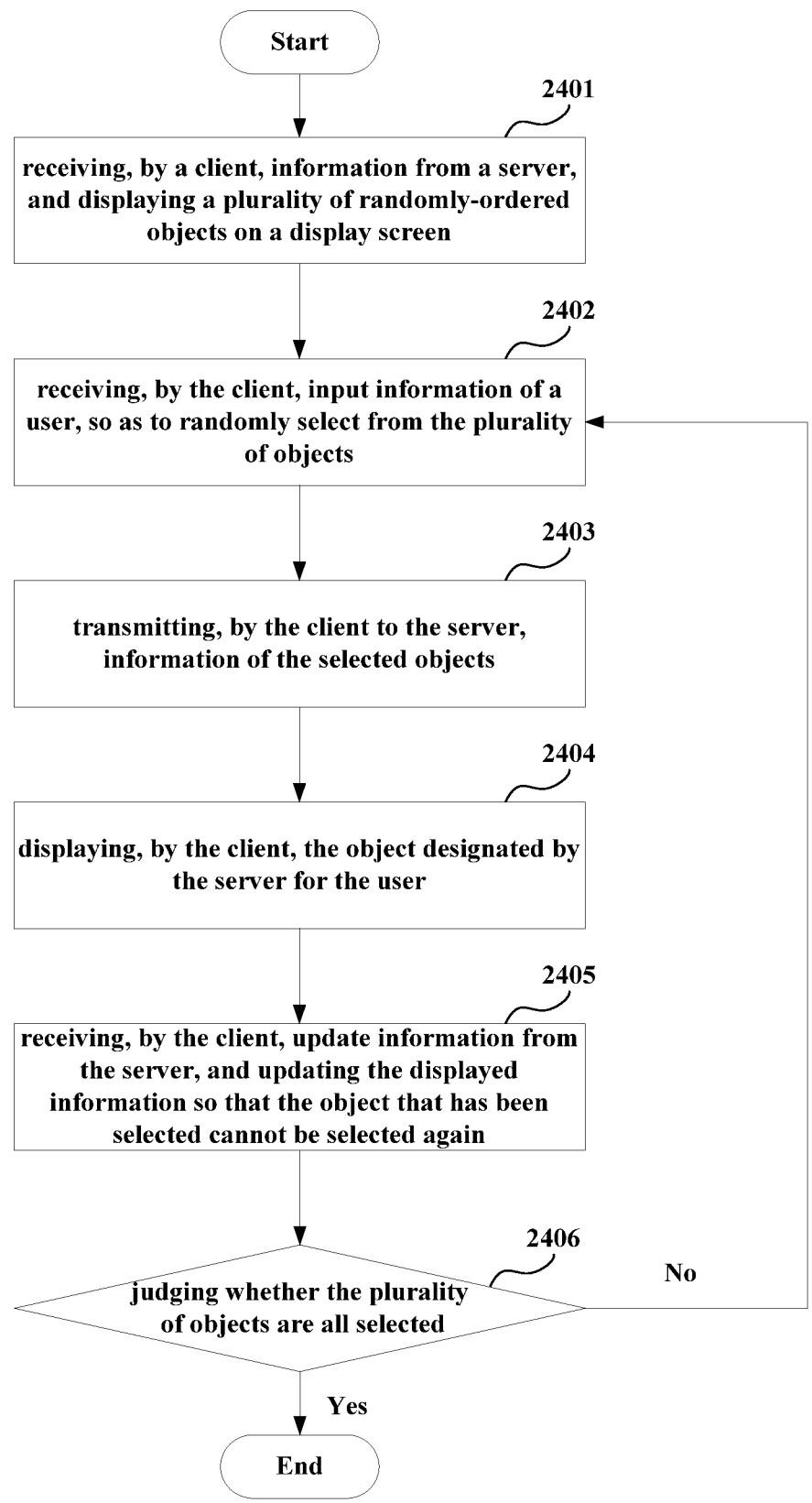
FIG. 24 is another flowchart of the random selection method of the embodiment 3 of the present invention.

FIG. 24 is still another flowchart of the random selection method of the embodiment of the present invention. As shown in FIG. 24, the random selection method comprises:

step 2401: receiving, by a client, information from a server, and displaying a plurality of randomly-ordered objects on a display screen;

step 2402: receiving, by the client, input information of a user, so as to randomly select from the plurality of objects;

step 2403: transmitting, by the client to the server, information of the selected objects;

step 2404: displaying, by the client, the object designated by the server for the user;

step 2405: receiving, by the client, update information from the server, and updating the displayed information so that the object that has been selected cannot be selected again; and step 2406: judging whether the plurality of objects are all selected, terminating the process of random selection if the plurality of objects are all selected, and executing step 2402 to continue the random selection if there remain objects that are not selected.

It can be seen from the above embodiment that the server randomly order a plurality of objects, a user randomly selects an object from the ordered plurality of objects, and the user-selected object is designated to the user according to the information fed back by the user, such that the user may participate in the process of random selection, and random ordering by the system and the random selection by the user are combined, thereby the fairness of the random dealing is ensured.

Embodiment 4

This embodiment of the present invention provides a server, applied in a distributed system of online games. This embodiment corresponds to the method of embodiment 1 or 2, and the identical parts shall not be described any further.

Figure 25:
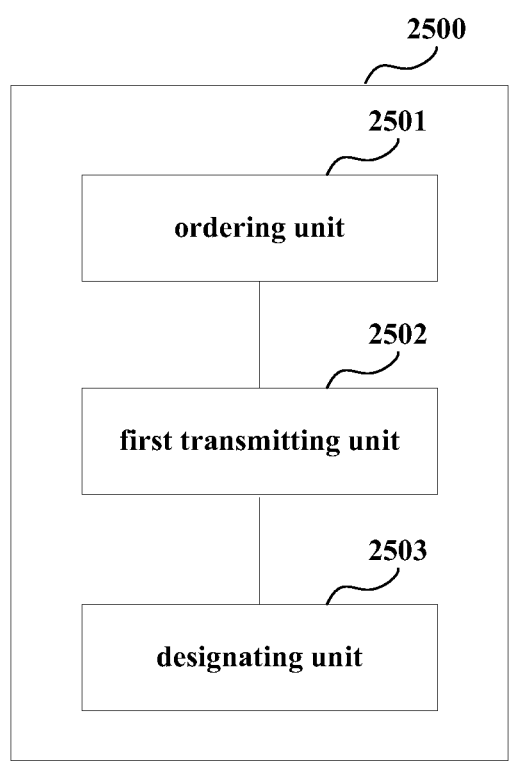
FIG. 25 is a schematic diagram of the server of the embodiment 4 of the present invention.

FIG. 25 is a schematic diagram of the construction of the server of the embodiment of the present invention. As shown in FIG. 25, the server 2500 includes: an ordering unit 2501, a first transmitting unit 2502 and a designating unit 2503. Other parts of the server 2500 may refer to those of the prior art, which shall not be described any further.

Where, the ordering unit 2501 is configured to generate a plurality of objects for an online game, and randomly order the plurality of objects; the first transmitting unit 2502 transmits display information to a plurality of clients, so as to make the ordered plurality of objects displayed on a display screen of each client in a manner of content being unknown, so that each user can randomly select the ordered plurality of objects; and the designating unit 2503 designates a user-selected object to the user according to the information fed back by the client.

Figure 26:
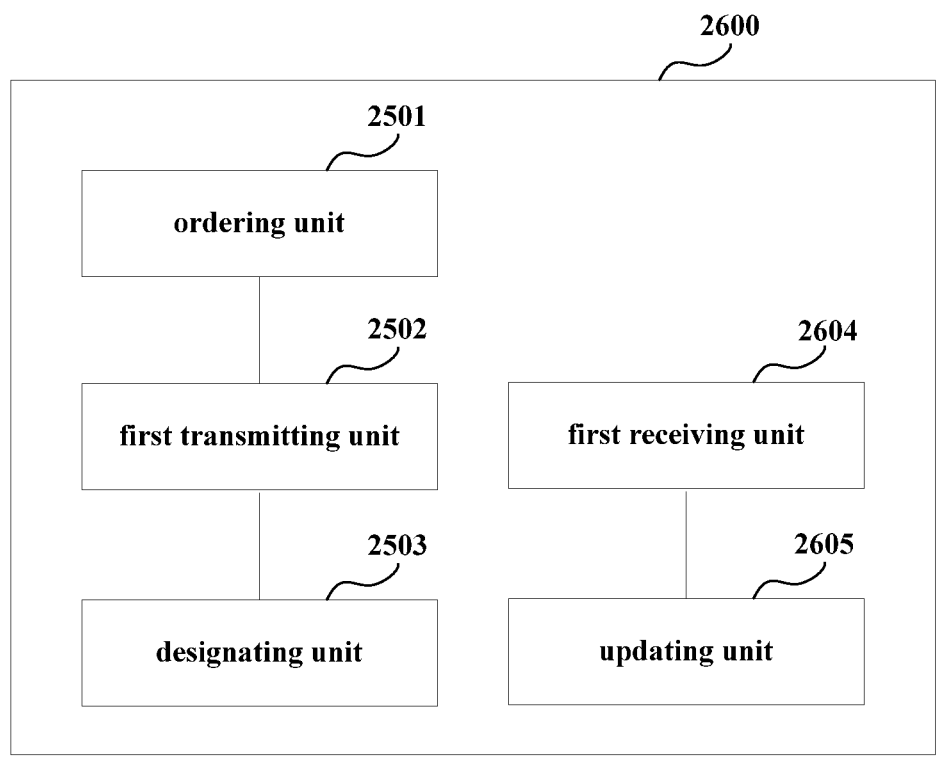
FIG. 26 is another schematic diagram of the server of the embodiment 4 of the present invention.

FIG. 26 is another schematic diagram of the construction of the server of the embodiment of the present invention. As shown in FIG. 26, the server 2600 includes: an ordering unit 2501, a first transmitting unit 2502 and a designating unit 2503, as described above.

As shown in FIG. 26, the server 2600 may further include a first receiving unit 2604 and an updating unit 2605. Where, the first receiving unit 2604 receives information of a selected object transmitted by a user via a client; and the updating unit 2605 updates display information of other clients, so that other users cannot select the object that has been selected.

It can be seen from the above embodiment that the server randomly order a plurality of objects, a user randomly selects an object from the ordered plurality of objects, and the user-selected object is designated to the user according to the information fed back by the user, such that the user may participate in the process of random selection, and random ordering by the system and the random selection by the user are combined, thereby the fairness of the random dealing is ensured.

Embodiment 5

This embodiment of the present invention provides a client, applied in a distributed system of online games. This embodiment corresponds to the method of embodiment 3, and the identical parts shall not be described any further.

Figure 27:
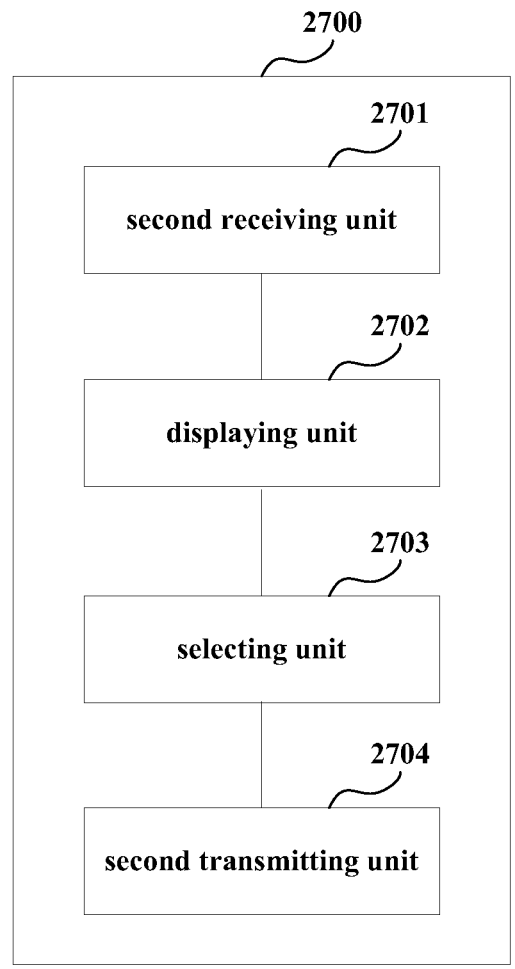
FIG. 27 is a schematic diagram of the client of the embodiment 5 of the present invention.

FIG. 27 is a schematic diagram of the construction of the client of the embodiment of the present invention. As shown in FIG. 27, the client 2700 includes: a second receiving unit 2701, a displaying unit 2702, a selecting unit 2703 and a second transmitting unit 2704. Other parts of the client 2700 may refer to those of the prior art, which shall not be described any further.

Wherein, the second receiving unit 2701 receives information transmitted by a server, the displaying unit 2702 displays a plurality of randomly-ordered objects on a display screen in a manner of content being unknown, the selecting unit 2703 receives input information of a user, so as to randomly select from the plurality of objects, and the second transmitting unit 2704 transmits information of the selected objects to the server.

In this embodiment, the displaying unit 2702 may further be configured to display the object designated by the server for the user.

In this embodiment, the second receiving unit 2701 may further be configured to receive update information transmitted by the server, and the displaying unit 2702 may further be configured to update the display information, so that other users cannot select the object that has been selected.

It can be seen from the above embodiment that the server randomly order a plurality of objects, a user randomly selects an object from the ordered plurality of objects, and the user-selected object is designated to the user according to the information fed back by the user, such that the user may participate in the process of random selection, and random ordering by the system and the random selection by the user are combined, thereby the fairness of the random dealing is ensured.

Embodiment 6

This embodiment of the present invention provides a distributed system, which is applicable to online games. The distributed system may include the server mentioned in embodiment 4 and the client mentioned in embodiment 5.

Figure 28:
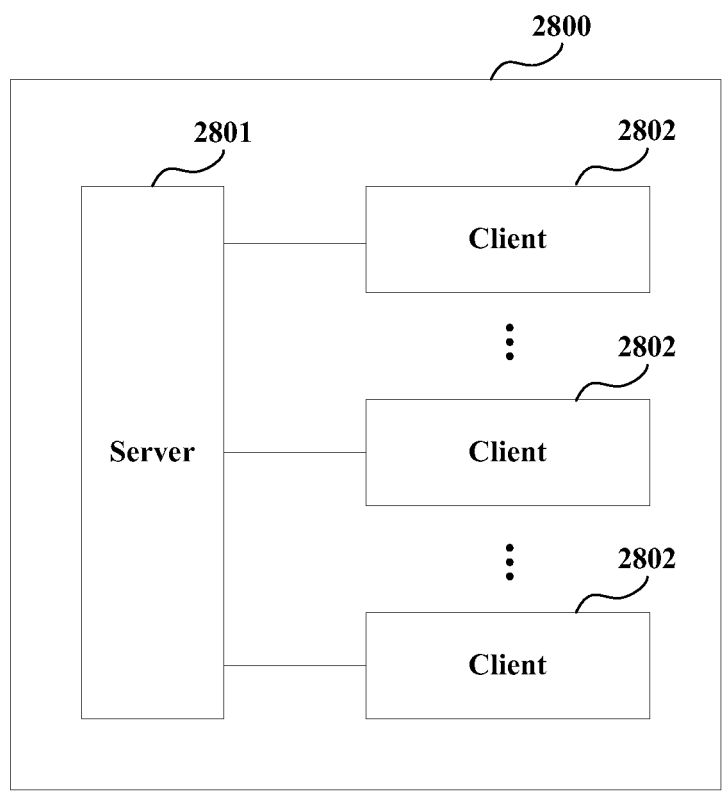
FIG. 28 is a schematic diagram of the distributed system of the embodiment 6 of the present invention.

FIG. 28 is a schematic diagram of the construction of the distributed system of the embodiment of the present invention. As shown in FIG. 28, the distributed system 2800 includes a server 2801 and a plurality of clients 2802. Other parts of the distributed system 2800 are similar to those of the prior art, which shall not be described any further.

Where, the server 2801 generates a plurality of objects for an online game, and orders randomly the plurality of objects; transmits display information to a plurality of clients, so as to make the ordered plurality of objects displayed on a display screen of each client in a manner of content being unknown, such that each user randomly selects from the ordered plurality of objects; and designates the selected object to the user according to the information fed back by the client.

The plurality of clients 2802 receive the information transmitted by the server 2801, and display the plurality of randomly-ordered objects on the display screen in a manner of content being unknown; receive input information of the user and randomly select from the plurality of objects; and transmit the information of the selected object to the server 2801.

In this embodiment, the server 2801 may further be configured to receive the information of the selected object transmitted by the user via the client, and updates the display information of other clients; and the clients 2802 may further be configured to receive the update information transmitted by the server 2801, and update the display information so that the object that has been selected cannot be selected again.

It can be seen from the above embodiment that the server randomly order a plurality of objects, a user randomly selects an object from the ordered plurality of objects, and the user-selected object is designated to the user according to the information fed back by the user, such that the user may participate in the process of random selection, and random ordering by the system and the random selection by the user are combined, thereby the fairness of the random dealing is ensured.

An embodiment of the present invention further provides a computer-readable program, wherein when the program is executed in a server, the program enables the computer to carry out the random selection method in the server.

An embodiment of the present invention further provides a storage medium in which a computer-readable program is stored, wherein the computer-readable program enables the computer to carry out the random selection method in a server.

An embodiment of the present invention further provides a computer-readable program, wherein when the program is executed in a client, the program enables the computer to carry out the random selection method in the client.

An embodiment of the present invention further provides a storage medium in which a computer-readable program is stored, wherein the computer-readable program enables the computer to carry out the random selection method in a client.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the particular feature of the present invention is described with respect to only one or more of the illustrated embodiments, such a feature may be combined with one or more other features of other embodiments as desired and in consideration of advantageous aspects of any given or particular application.

The invention claimed is:

1. A random selection method, applied in a distributed system of online games, the random selection method comprising:
    generating, by a server, a plurality of objects for an online games;
    ordering, by the server, the plurality of objects randomly to perform a first random operation;
    transmitting, by the server, display information to a plurality of clients;
    receiving, by a client, information transmitted by the server, and displaying a plurality of server-randomly ordered objects on a display screen in a manner whereby the content of the object is unknown;
    receiving, by the client, input information of a user for randomly selecting an unknown object from the plurality of objects to perform a second random operation;
    transmitting, by the client to the server, information of the selected unknown object; and
    designating, by the server, the user-selected object for the user according to feedback from the client.

2. The random selection method according to claim 1, wherein the method further comprises:
    receiving, by the server, information of a selected object transmitted by a user via a client; and
    updating display information of other clients, so that the other users cannot select the object that has been selected.

3. The random selection method according to claim 1, wherein the object is a card, poker chip, or mah-jong tile.

4. The random selection method according to claim 1, wherein the method further comprises:
    displaying, by the client, an object designated by the server for the user.

5. The random selection method according to claim 1, wherein the method further comprises:
    receiving, by the client, update information from the server, and updating display information so that the object that has been selected cannot be selected again.

6. The random selection method according to claim 1, wherein the client displays the plurality of objects in a tiling or superimposed tiling manner.

7. The random selection method according to claim 6, wherein the client receives the information inputted by the user in a clicking selection manner, so as to randomly select from the plurality of objects.

8. A server, configured in a distributed system of online games, the server comprising:
    an ordering unit, configured to generate a plurality of objects for an online game, and randomly order the plurality of objects to perform a first random operation;
    a first transmitting unit, configured to transmit display information to a plurality of clients, to make the server-randomly-ordered plurality of objects displayed on a display screen of each client in a manner whereby the content of the objects is unknown, so that each user randomly selects an unknown object from the ordered plurality of objects to perform a second random operation; and
    a designating unit, configured to designate the user-selected object for the user according to feedback from the client.

9. The server according to claim 8, wherein the server further comprises:
    a first receiving unit, configured to receive information of the selected object transmitted by a user via a client; and
    an updating unit, configured to update display information of other clients, so that the other users cannot select the object that has been selected.

10. A client, configured in a distributed system of online games, the client comprising:
    a second receiving unit, configured to receive display information transmitted by a server; wherein a plurality of objects of the display information have been randomly ordered by the server to perform a first random operation;
    a displaying unit, configured to display the plurality of server-randomly-ordered objects on a display screen in a manner whereby the content of the objects is unknown;
    a selecting unit, configured to receive input information of a user for randomly selecting an unknown object from the plurality of objects to perform a second random operation; and
    a second transmitting unit, configured to transmit information of the selected object to the server.

11. The client according to claim 10, wherein the displaying unit is further configured to display the object designated by the server for the user.

12. The client according to claim 10, wherein the displaying unit is further configured to display the plurality of objects in a tiling or superimposed tiling manner.

13. The client according to claim 12, wherein the selecting unit is further configured to receive the information inputted by the user in a clicking selection manner, so as to randomly select from the plurality of objects.

14. The client according to claim 10, wherein the second receiving unit is further configured to receive update information from the server, and the displaying unit is further configured to update display information, so that the object that has been selected cannot be selected again.

15. A distributed system, which is configured to play online games, the distributed system comprising:
    a server, configured to generate a plurality of objects for an online game, and order randomly the plurality of objects to perform a first random operation; transmit display information to a plurality of clients, to make the server-randomly-ordered plurality of objects displayed on a display screen of each client in a manner whereby the content of the objects is unknown; and designate a user-selected object for the user according to feedback from the client; and a plurality of clients, configured to receive the display information transmitted by the server, and display the plurality of server-randomly-ordered objects on the display screen in a manner of content being unknown; receive input information of the user for randomly selecting an unknown object from the plurality of objects to perform a second random operation; and transmit the information of the selected object to the server.

16. The distributed system according to claim 15, wherein:

the server receives the information of the selected object transmitted by a user via a client, and updates the display information of other clients; and the clients receive the update information from the server, and update the display information so that the object that has been selected cannot be selected.

* * * * *